United States Patent
Tahara et al.

(10) Patent No.: US 11,290,134 B2
(45) Date of Patent: Mar. 29, 2022

(54) RADIO FREQUENCY MODULE

(71) Applicant: Murata Manufacturing Co., Ltd., Kyoto (JP)

(72) Inventors: Kenji Tahara, Kyoto (JP); Reiji Nakajima, Kyoto (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

(21) Appl. No.: 17/023,822

(22) Filed: Sep. 17, 2020

(65) Prior Publication Data

US 2021/0006273 A1 Jan. 7, 2021

Related U.S. Application Data

(63) Continuation of application No. PCT/JP2019/005361, filed on Feb. 14, 2019.

(30) Foreign Application Priority Data

Mar. 30, 2018 (JP) .............................. JP2018-070040
Mar. 30, 2018 (JP) .............................. JP2018-070041

(51) Int. Cl.
*H04B 1/00* (2006.01)
*H01Q 3/36* (2006.01)
*H04B 1/04* (2006.01)

(52) U.S. Cl.
CPC ............. *H04B 1/0057* (2013.01); *H01Q 3/36* (2013.01); *H04B 1/0483* (2013.01)

(58) Field of Classification Search
CPC combination set(s) only.
See application file for complete search history.

(56) References Cited

U.S. PATENT DOCUMENTS

| 10,965,021 B2 * | 3/2021 | Wloczysiak | H04B 1/18 |
| 2004/0121753 A1 * | 6/2004 | Sugar | H04B 1/006 455/333 |

(Continued)

FOREIGN PATENT DOCUMENTS

| CN | 107710629 A | 2/2018 |
| JP | 2000013276 A | 1/2000 |

(Continued)

OTHER PUBLICATIONS

International Search Report issued in Application No. PCT/JP2019/005361, dated Mar. 19, 2019.

(Continued)

*Primary Examiner* — Junpeng Chen
(74) *Attorney, Agent, or Firm* — Pearne & Gordon LLP (57) ABSTRACT

Opposite-side frequency bands are opened in a plurality of carrier aggregations. In a radio frequency module, a variable phase shifter differentiates a phase in a first single mode in which signals of a first frequency band are communicated and a phase in a first carrier aggregation mode and differentiates the phase in the first single mode and a phase in a second carrier aggregation mode. The variable phase shifter makes a phase difference between the phase in the first single mode and the phase in the first carrier aggregation mode different from a phase difference between the phase in the first single mode and the phase in the second carrier aggregation mode.

19 Claims, 4 Drawing Sheets

(56) References Cited

U.S. PATENT DOCUMENTS

| | | | |
|---|---|---|---|
| 2005/0085202 A1* | 4/2005 | Ella | H04B 1/0057 455/168.1 |
| 2006/0044080 A1* | 3/2006 | Hagiwara | H03H 9/0576 333/195 |
| 2017/0063412 A1 | 3/2017 | Ripley et al. | |
| 2017/0117933 A1 | 4/2017 | Khlat et al. | |
| 2018/0076834 A1 | 3/2018 | Wloczysiak et al. | |
| 2018/0123549 A1 | 5/2018 | Takeuchi | |
| 2019/0181890 A1* | 6/2019 | Schmidhammer | H04B 1/0057 |

FOREIGN PATENT DOCUMENTS

| | | |
|---|---|---|
| JP | 2016096486 A | 5/2016 |
| WO | 2017006867 A1 | 1/2017 |
| WO | 2018031163 A1 | 2/2018 |

OTHER PUBLICATIONS

Written Opinion issued in Application No. PCT/JP2019/005361, dated Mar. 19, 2019.

* cited by examiner

Band12

FIG. 3B

Band29

FIG. 3C

Band28A

FIG. 3D

Band13

FIG. 4

RADIO FREQUENCY MODULE

This is a continuation of International Application No. PCT/JP2019/005361 filed on Feb. 14, 2019 which claims priority from Japanese Patent Application Nos. 2018-070041 filed on Mar. 30, 2018 and 2018-070040 filed on Mar. 30, 2018. The contents of these applications are incorporated herein by reference in their entireties.

BACKGROUND OF THE DISCLOSURE

1. Field of the Disclosure

The present disclosure relates generally to a radio frequency module, and more particularly, to a radio frequency module capable of supporting carrier aggregation.

2. Description of the Related Art

An existing radio frequency module in which a carrier aggregation scheme is adopted has been known (see, for example, International Publication No. WO 2017/006867). In the radio frequency module described in International Publication No. WO 2017/006867, the carrier aggregation scheme is adopted in which signals of at least two frequency bands selected from a plurality of frequency bands having frequencies different from each other are simultaneously communicated. The radio frequency module described in International Publication No. WO 2017/006867 includes a plurality of band filters, a plurality of variable matching circuits, and a switch. The plurality of variable matching circuits corresponds to the plurality of band filters in a one-to-one correspondence manner and is provided between the corresponding band filters and the switch. Each variable matching circuit includes a variable capacitance element connected in series to the band filter and an inductance element provided between the ground and a path connecting the band filter and the switch.

However, in the existing radio frequency module, there has been a problem in that in a case of supporting a plurality of carrier aggregations, it is impossible to open opposite-side frequency bands (opposite bands) in all frequency bands for which the carrier aggregations are performed. The opposite-side frequency band indicates the other frequency band of two frequency bands when viewed from one frequency band thereof in the carrier aggregation.

For example, a first frequency band includes two frequency bands (a fourth frequency band and a fifth frequency band), carrier aggregation for simultaneously communicating signals of the fourth frequency band and signals of a second frequency band is performed, and carrier aggregation for simultaneously communicating signals of the fifth frequency band and signals of a third frequency band is performed. In a case of special combinations of frequency bands having the above-described first to fifth frequency bands, it is very difficult to open all the second frequency band and the third frequency band as the opposite-side frequency bands for the first frequency band.

BRIEF SUMMARY OF THE DISCLOSURE

An object of the present disclosure is to provide a radio frequency module that can open opposite-side frequency bands in a plurality of carrier aggregations.

A radio frequency module according to an aspect of the present disclosure includes a first filter, a second filter, a third filter, a switch, and a variable phase shifter. The first filter transmits signals of a first frequency band. The second filter transmits signals of a second frequency band. The third filter transmits signals of a third frequency band. The switch has a common terminal, a first connected terminal, a second connected terminal, and a third connected terminal. The common terminal is connected to an antenna. The first connected terminal is connected to the first filter. The second connected terminal is connected to the second filter. The third connected terminal is connected to the third filter. The variable phase shifter is provided between the switch and ground. The first frequency band includes a fourth frequency band and a fifth frequency band. In a first single mode in which the signals of the first frequency band are communicated, the switch electrically connects the first filter to the common terminal. In a first carrier aggregation mode in which signals of the fourth frequency band and the signals of the second frequency band are simultaneously communicated, the switch electrically connects the first filter, the second filter, and the variable phase shifter to the common terminal. In a second carrier aggregation mode in which signals of the fifth frequency band and the signals of the third frequency band are simultaneously communicated, the switch electrically connects the first filter, the third filter, and the variable phase shifter to the common terminal. The variable phase shifter differentiates a phase in the first single mode and a phase in the first carrier aggregation mode and differentiates the phase in the first single mode and a phase in the second carrier aggregation mode. The radio frequency module makes a phase difference between the phase in the first single mode and the phase in the first carrier aggregation mode different from a phase difference between the phase in the first single mode and the phase in the second carrier aggregation mode.

A radio frequency module according to another aspect of the present disclosure includes a first filter, a second filter, a third filter, a switch, a first variable capacitance element, and a variable reactance circuit. The first filter transmits signals of a first frequency band. The second filter transmits signals of a second frequency band. The third filter transmits signals of a third frequency band. The switch has a common terminal, a first connected terminal, a second connected terminal, and a third connected terminal. The common terminal is connected to an antenna. The first connected terminal is connected to the first filter. The second connected terminal is connected to the second filter. The third connected terminal is connected to the third filter. The first variable capacitance element is connected in series between the first filter and the switch. The variable reactance circuit is provided between the switch and ground. The first frequency band includes a fourth frequency band and a fifth frequency band. In a single mode in which the signals of the first frequency band are communicated, the switch electrically connects at least the first filter to the common terminal. In a first carrier aggregation mode in which signals of the fourth frequency band and the signals of the second frequency band are simultaneously communicated, the switch electrically connects the first filter, the second filter, and the variable reactance circuit to the common terminal. In a second carrier aggregation mode in which the signals of the fourth frequency band and the signals of the third frequency band are simultaneously communicated, the switch electrically connects the first filter, the third filter, and the variable reactance circuit to the common terminal. The first variable capacitance element differentiates capacitance among the single mode, the first carrier aggregation mode, and the second carrier aggregation mode. The variable reactance circuit differentiates reactance among the single mode, the first carrier aggregation mode, and the second carrier aggregation mode.

Other features, elements, characteristics and advantages of the present disclosure will become more apparent from the following detailed description of preferred embodiments of the present disclosure with reference to the attached drawings.

DETAILED DESCRIPTION OF THE DISCLOSURE

Hereinafter, radio frequency modules according to Embodiments 1 and 2 will be described with reference to the drawings. The drawings described in the following embodiments and the like are schematic views, and ratios of the sizes and thicknesses of respective constituent components in the drawings do not necessarily reflect actual dimensional ratios.

Embodiment 1

1. Radio Frequency Module

First, the overall configuration of a radio frequency module 1 according to Embodiment 1 will be described with reference to the drawings.

Figure 1:
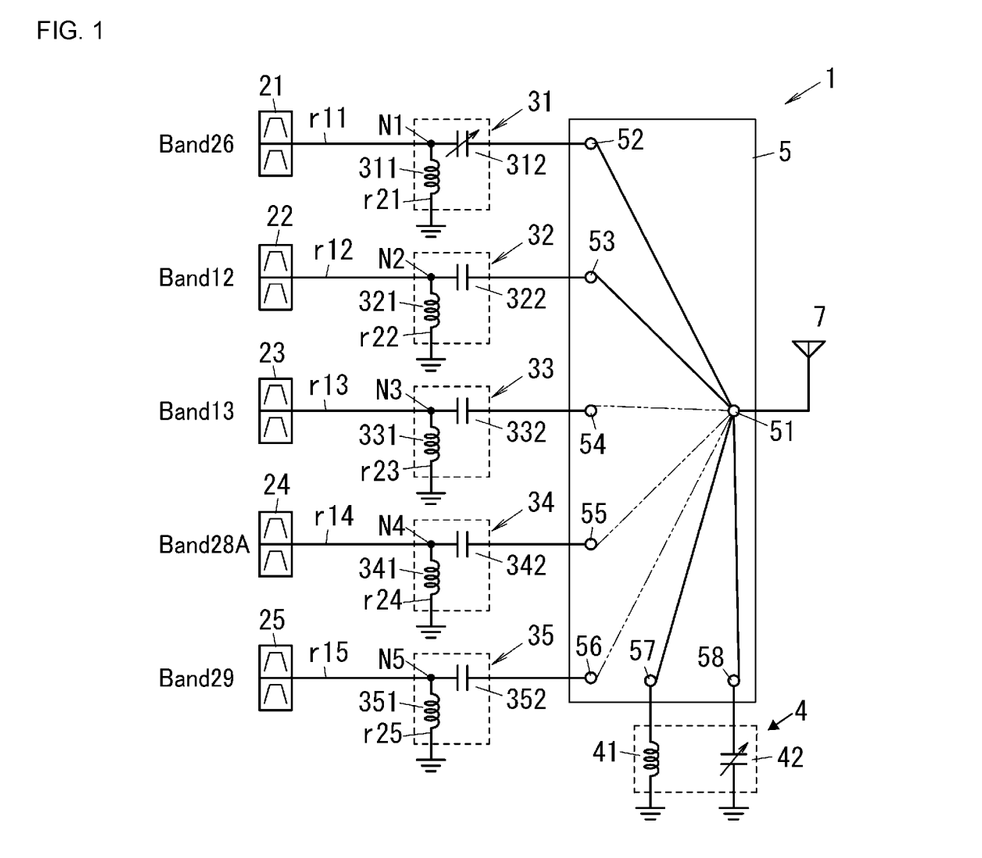
FIG. 1 is a schematic configuration diagram of a radio frequency module according to an embodiment of the present disclosure.

As illustrated in FIG. 1, the radio frequency module 1 according to the embodiment includes a filter 21 (first filter), a filter 22 (second filter), a filter 23 (second filter), a filter 24 (third filter), a filter 25 (second filter), a switch 5, and a variable phase shifter (variable reactance circuit) 4. The filter 21 transmits signals of Band 26 (first frequency band) of the Long Term Evolution (LTE) standard. The filter 22 transmits signals of Band 12 (second frequency band). The filter 23 transmits signals of Band 13 (second frequency band) of the LTE standard. The filter 24 transmits signals of Band 28A (third frequency band) of the LTE standard. The filter 25 transmits signals of Band 29 (second frequency band) of the LTE standard. The switch 5 selectively connects the filter 21, the filter 22, the filter 23, the filter 24, and the filter 25 and an antenna 7 to each other. The variable phase shifter 4 is provided between the switch 5 and ground. Band 26 includes Band 5 and Band 18.

In a single mode in which only the signals of Band 26 are communicated, the switch 5 electrically connects only the filter 21 to the antenna 7. In a first carrier aggregation mode in which signals of Band 5 and the signals of Band 12 are simultaneously communicated, the switch 5 connects the filter 21, the filter 22, and the variable phase shifter 4 to the antenna 7. In the first carrier aggregation mode in which the signals of Band 5 and the signals of Band 13 are simulta-neously communicated, the switch 5 connects the filter 21, the filter 23, and the variable phase shifter 4 to the antenna 7. In the first carrier aggregation mode in which the signals of Band 5 and the signals of Band 29 are simultaneously communicated, the switch 5 connects the filter 21, the filter 25, and the variable phase shifter 4 to the antenna 7. In a second carrier aggregation mode in which signals of Band 18 and the signals of Band 28A are simultaneously communicated, the switch 5 electrically connects the filter 21, the filter 24, and the variable phase shifter 4 to the antenna 7.

In the above-described radio frequency module 1, the variable phase shifter 4 changes (makes different) a phase in the single mode in which the signals of Band 26 are communicated and a phase in the first carrier aggregation mode, and changes (makes different) the phase in the single mode in which the signals of Band 26 are communicated and a phase in the second carrier aggregation mode. A phase difference between the phase in the single mode in which the signals of Band 26 are communicated and the phase in the first carrier aggregation mode is different from a phase difference between the phase in which the signals of Band 26 are communicated and the phase in the second carrier aggregation mode.

The radio frequency module 1 according to the embodiment is used for an electronic apparatus such as a mobile phone including a smartphone.

2. Each of Constituent Components of Radio Frequency Module

Next, each of constituent components of the radio frequency module 1 according to the embodiment will be described with reference to the drawings.

Figure 2:
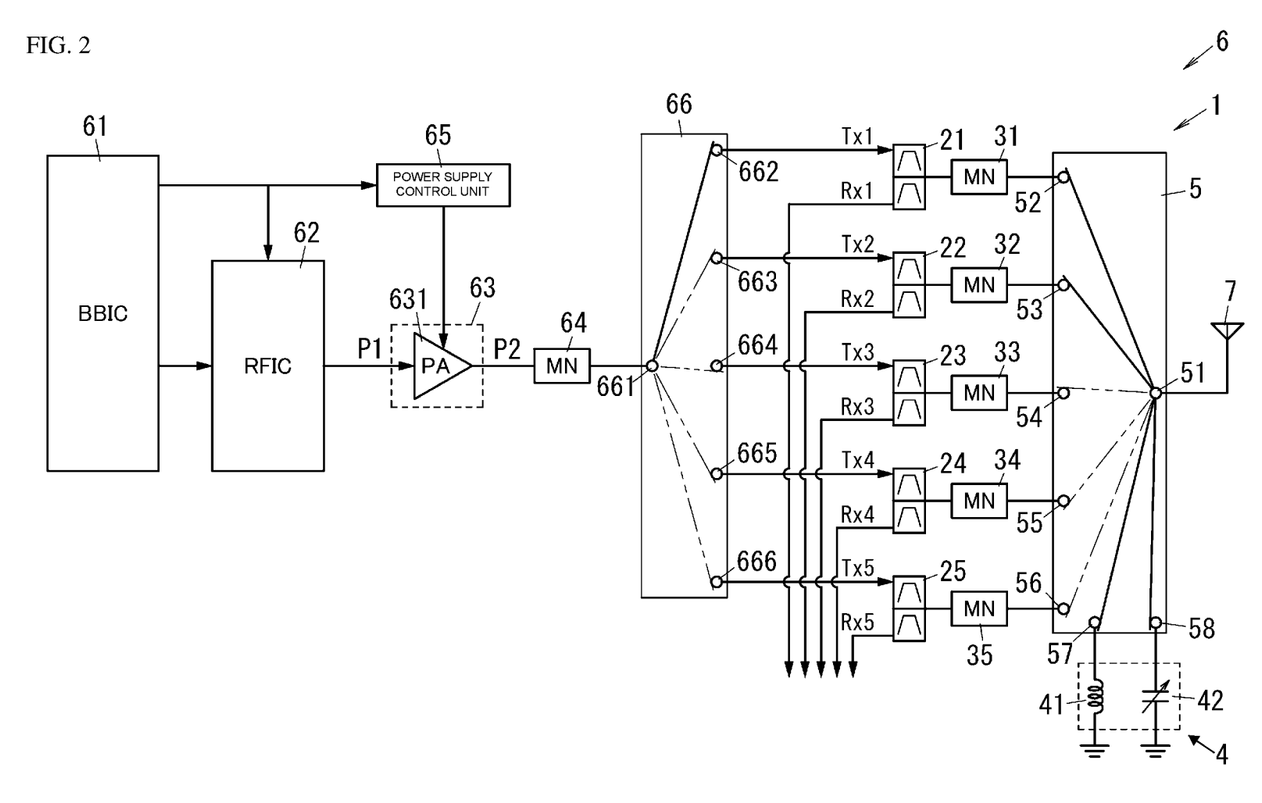
FIG. 2 is a schematic configuration diagram of a communication apparatus according to an embodiment of the disclosure.

As illustrated in FIG. 1, the radio frequency module 1 includes the plurality of (five in the illustrated example) filters 21 to 25, a plurality of (five in the illustrated example) matching circuits (a first matching circuit 31, a second matching circuit 32, a third matching circuit 33, a fourth matching circuit 34, and a fifth matching circuit 35), the variable phase shifter 4, and the switch 5. As illustrated in FIG. 2, the radio frequency module 1 further includes a transmission circuit 63, a matching network 64, a power supply control unit 65, and a band switch 66.

2.1. Filter

The filter 21 is, for example, a Surface Acoustic Wave (SAW) filter and transmits radio frequency signals of Band 26 (reception band: 859 MHz to 894 MHz, transmission band: 814 MHz to 849 MHz) of the LTE standard. Band 26 includes Band 5 (reception band: 869 MHz to 894 MHz, transmission band: 824 MHz to 849 MHz) and Band 18 (reception band: 860 MHz to 875 MHz, transmission band: 815 MHz to 830 MHz) of the LTE standard. Band 26 corresponds to the first frequency band, Band 5 corresponds to a fourth frequency band included in the first frequency band, and Band 18 corresponds to a fifth frequency band included in the first frequency band. The filter 21 corresponds to the first filter that transmits the signals of the first frequency band including the fourth frequency band and the fifth frequency band.

The filter 22 is, for example, a SAW filter and transmits radio frequency signals of Band 12 (reception band: 729 MHz to 746 MHz, transmission band: 699 MHz to 716 MHz) of the LTE standard. Band 12 is used for carrier aggregation together with Band 5 and therefore corresponds to the second frequency band that is used for the first carrier aggregation together with the fourth frequency band. The filter 22 corresponds to the second filter that transmits the signals of the second frequency band.

The filter 23 is, for example, a SAW filter and transmits radio frequency signals of Band 13 (reception band: 746 MHz to 756 MHz, transmission band: 777 MHz to 787 MHz) of the LTE standard. Band 13 is used for carrier aggregation together with Band 5 and therefore corresponds to the second frequency band that is used for the first carrier aggregation together with the fourth frequency band. The filter 23 corresponds to the second filter that transmits the signals of the second frequency band.

The filter 24 is, for example, a SAW filter and transmits radio frequency signals of Band 28A (reception band: 758 MHz to 788 MHz, transmission band: 703 MHz to 733 MHz) of the LTE standard. Band 28A is used for a carrier aggregation together with Band 18 and therefore corresponds to the third frequency band that is used for the second carrier aggregation together with the fifth frequency band. The filter 24 corresponds to the third filter that transmits the signals of the third frequency band.

The filter 25 is, for example, a SAW filter and transmits radio frequency signals of Band 29 (reception band: 717 MHz to 727 MHz) of the LTE standard. Band 29 is used for the carrier aggregation together with Band 5 and therefore corresponds to the second frequency band that is used for the first carrier aggregation together with the fourth frequency band. The filter 25 corresponds to the second filter that transmits the signals of the second frequency band.

2.2. Matching Circuit

The first matching circuit 31 is a variable capacitance element connected in series between the filter 21 and the switch 5. The first matching circuit 31 has an inductor 311 and a Digital Tunable Capacitor (DTC) 312 (parallel variable capacitance element). The inductor 311 is provided on a path r21 between the ground and a node N1 on a path r11 connecting the filter 21 and the switch 5. The DTC 312 is an element capable of changing capacitance between both terminals and is provided on the path r11. That is, of both the terminals of the DTC 312, a first terminal is connected to the filter 21 and a second terminal is connected to the switch 5.

The second matching circuit 32 has an inductor 321 and a capacitor 322. The inductor 321 is provided on a path r22 between the ground and a node N2 on a path r12 connecting the filter 22 and the switch 5. The capacitor 322 is provided on the path r12. That is, of both terminals of the capacitor 322, a first terminal is connected to the filter 22 and a second terminal is connected to the switch 5.

The third matching circuit 33 has an inductor 331 and a capacitor 332. The inductor 331 is provided on a path r23 between the ground and a node N3 on a path r13 connecting the filter 23 and the switch 5. The capacitor 332 is provided on the path r13. That is, of both terminals of the capacitor 332, a first terminal is connected to the filter 23 and a second terminal is connected to the switch 5.

The fourth matching circuit 34 has an inductor 341 and a capacitor 342. The inductor 341 is provided on a path r24 between the ground and a node N4 on a path r14 connecting the filter 24 and the switch 5. The capacitor 342 is provided on the path r14. That is, of both terminals of the capacitor 342, a first terminal is connected to the filter 24 and a second terminal is connected to the switch 5.

The fifth matching circuit 35 has an inductor 351 and a capacitor 352. The inductor 351 is provided on a path r25 between the ground and a node N5 on a path r15 connecting the filter 25 and the switch 5. The capacitor 352 is provided on the path r15. That is, of both terminals of the capacitor 352, a first terminal is connected to the filter 25 and a second terminal is connected to the switch 5.

2.3. Variable Phase Shifter

The variable phase shifter 4 is provided between the switch 5 and the ground. The variable phase shifter 4 includes an inductor 41 and a DTC 42. The inductor 41 is provided between the switch 5 and the ground. The DTC 42 is a variable capacitance element that is connected in parallel to the inductor 41. As with the inductor 41, the DTC 42 is provided between the switch 5 and the ground. In the switch 5, when selection terminals 57 and 58 described later are connection destinations of a common terminal 51 described later, the inductor 41 and the DTC 42 are connected in parallel to each other. The DTC 42 is an element capable of adjusting capacitance between both terminals. More specifically, the DTC 42 has a first capacitance, a second capacitance, a third capacitance, and a fourth capacitance in a selectable manner.

When the filter 21 is the SAW filter as in the embodiment, opposite-side impedance in the carrier aggregation using the signal of the filter 21 has a capacitive component in many cases (the fourth quadrant of the Smith chart). Here, the opposite side indicates the other one of two frequency bands when viewed from one of them in the carrier aggregation.

For this reason, it is conceivable to include a plurality of inductors in order to open the opposite-side impedances, but the number of inductors is preferably small because the size of the inductor is large.

Therefore, in the embodiment, the opposite-side impedance that is used for the carrier aggregation is moved in an open direction by one inductor 41 (moved to the first quadrant of the Smith chart), and excessive inductivity is adjusted by the DTC 42 depending on the opposite-side frequency band to be used for the carrier aggregation.

2.4. Switch

The switch 5 has the common terminal 51 and a plurality of (seven in the illustrated example) selection terminals 52 to 58 (connected terminals). The switch 5 selects at least one of the plurality of selection terminals 52 to 58 as a connection destination of the common terminal 51. That is, the switch 5 selectively connects the filters 21 to 25 and the antenna 7.

The common terminal 51 is electrically connected to the antenna 7. Note that the common terminal 51 is not limited to be directly connected to the antenna 7. A filter, a coupler, or the like may be provided between the common terminal 51 and the antenna 7.

The selection terminal 52 is electrically connected to the filter 21 via the first matching circuit 31 (DTC 312). The selection terminal 53 is electrically connected to the filter 22 via the second matching circuit (capacitor 322). The selection terminal 54 is electrically connected to the filter 23 via the third matching circuit 33 (capacitor 332). The selection terminal 55 is electrically connected to the filter 24 via the fourth matching circuit 34 (capacitor 342). The selection terminal 56 is electrically connected to the filter 25 via the fifth matching circuit 35 (capacitor 352). The selection terminal 57 is electrically connected to the inductor 41 of the variable phase shifter 4. The selection terminal 58 is electrically connected to the DTC 42 of the variable phase shifter 4.

In the first single mode in which the signals of Band 26 (first frequency band) are communicated, the switch 5 electrically connects the filter 21 to the antenna 7. Specifically, in the first single mode in which the signals of Band 26 are communicated, the switch 5 connects the selection terminal 52 to the common terminal 51.

In the first carrier aggregation mode in which the signals of Band 5 (fourth frequency band) and the signals of Band 12 (second frequency band) are simultaneously communicated, the switch 5 electrically connects the filter 21, the filter 22, and the inductor 41 and the DTC 42 of the variable phase shifter 4 to the antenna 7. More specifically, in the first carrier aggregation mode, the switch 5 connects the selection terminal 52, the selection terminal 53, the selection terminal 57, and the selection terminal 58 to the common terminal 51.

In the first carrier aggregation mode in which the signals of Band 5 (fourth frequency band) and the signals of Band 13 (second frequency band) are simultaneously communicated, the switch 5 electrically connects the filter 21, the filter 23, and the inductor 41 and the DTC 42 of the variable phase shifter 4 to the antenna 7. More specifically, in the first carrier aggregation mode, the switch 5 connects the selection terminal 52, the selection terminal 54, the selection terminal 57, and the selection terminal 58 to the common terminal 51.

In the second carrier aggregation mode in which the signals of Band 18 (fifth frequency band) and the signals of Band 28A (third frequency band) are simultaneously communicated, the switch 5 electrically connects the filter 21, the filter 24, and the inductor 41 and the DTC 42 of the variable phase shifter 4 to the antenna 7. More specifically, in the second carrier aggregation mode, the switch 5 connects the selection terminal 52, the selection terminal 55, the selection terminal 57, and the selection terminal 58 to the common terminal 51.

In the first carrier aggregation mode in which the signals of Band 5 (fourth frequency band) and the signals of Band 29 (second frequency band) are simultaneously communicated, the switch 5 electrically connects the filter 21, the filter 25, and the inductor 41 and the DTC 42 of the variable phase shifter 4 to the antenna 7. More specifically, in the first carrier aggregation mode, the switch 5 connects the selection terminal 52, the selection terminal 56, the selection terminal 57, and the selection terminal 58 to the common terminal 51.

3. Opposite-Side Frequency Band Impedance Adjustment

Meanwhile, in the carrier aggregation mode, it is necessary to open the opposite-side frequency band such that the signals of the two frequency bands affect each other to deteriorate communication characteristics. Therefore, it is necessary to adjust the impedance of the opposite-side frequency band when viewed from the own filter. Here, the opposite-side frequency band indicates the other frequency band of two frequency bands when viewed from one frequency band thereof in the carrier aggregation.

The variable phase shifter 4 makes reactance different from one another among the first single mode in which the signals of Band 26 are communicated, the first carrier aggregation mode in which the signals of Band 5 and the signals of Band 12 are simultaneously communicated, the first carrier aggregation mode in which the signals of Band 5 and the signals of Band 13 are simultaneously communicated, the second carrier aggregation mode in which the signals of Band 18 and the signals of Band 28A are simultaneously communicated, and the first carrier aggregation mode in which the signals of Band 5 and the signals of Band 29 are simultaneously communicated.

For example, in the first single mode in which the signals of Band 26 (first frequency band) are communicated, the variable phase shifter 4 connects neither the inductor 41 nor the DTC 42 to the antenna 7. In the first carrier aggregation mode, the variable phase shifter 4 electrically connects the inductor 41 and the DTC 42 to the antenna 7 and sets the capacitance of the DTC 42 to be the first capacitance. In the second carrier aggregation mode, the variable phase shifter 4 electrically connects the inductor 41 and the DTC 42 to the antenna 7 and sets the capacitance of the DTC 42 to be the second capacitance. In the first carrier aggregation mode, the variable phase shifter 4 electrically connects the inductor 41 and the DTC 42 to the antenna 7 and sets the capacitance of the DTC 42 to be the third capacitance.

Figure 3A:
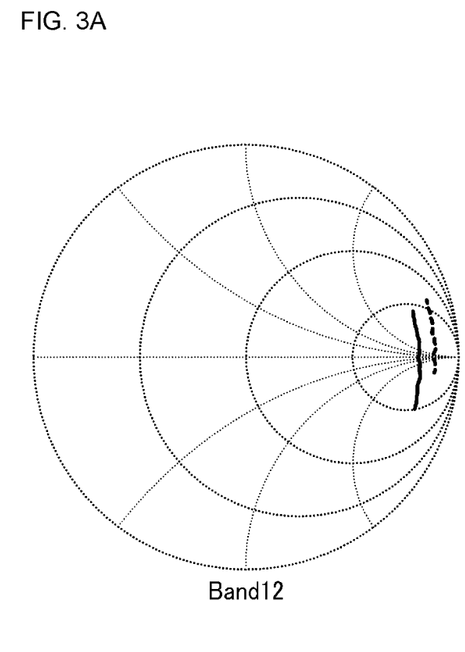
FIGS. 3A to 3D are Smith charts illustrating impedances of opposite-side frequency bands before and after adjustment in the above-described radio frequency module.

FIG. 3A illustrates impedance of the frequency band of Band 12 when viewed from the filter 21 of Band 26. A broken line in FIG. 3A indicates the impedance before adjustment, and a solid line in FIG. 3A indicates the impedance after adjustment. In this case, the variable phase shifter 4 adjusts the impedance from the state of the broken line in FIG. 3A to the state of the solid line in FIG. 3A by electrically connecting the inductor 41 to the antenna 7, and electrically connecting the DTC 42 to the antenna 7 after adjusting the capacitance of the DTC 42.

Figure 3B:
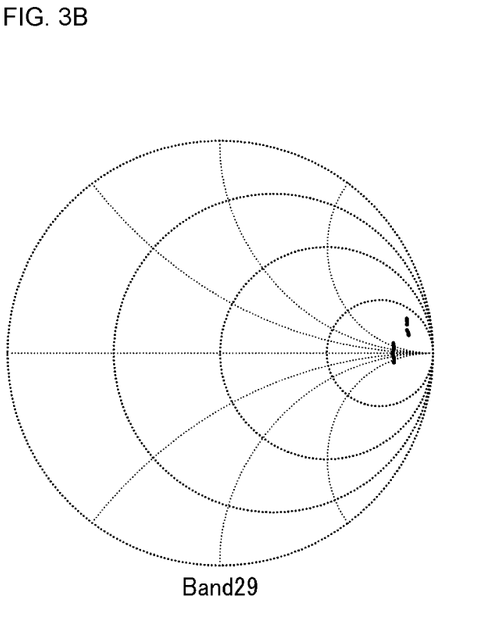

FIG. 3B illustrates impedance of the frequency band of Band 29 when viewed from the filter 21 of Band 26. A broken line in FIG. 3B indicates the impedance before adjustment, and a solid line in FIG. 3B indicates the impedance after adjustment. In this case, the variable phase shifter 4 adjusts the impedance from the state indicated by the broken line in FIG. 3B to the state indicated by the solid line in FIG. 3B by electrically connecting the inductor 41 to the antenna 7, and electrically connecting the DTC 42 to the antenna 7 after adjusting the capacitance of the DTC 42.

Figure 3C:
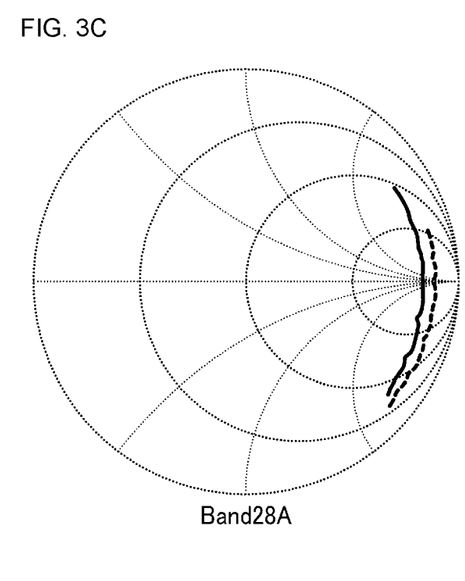

FIG. 3C illustrates impedance of the frequency band of Band 28A when viewed from the filter 21 of Band 26. A broken line in FIG. 3C indicates the impedance before adjustment, and a solid line in FIG. 3C indicates the impedance after adjustment. In this case, the variable phase shifter 4 adjusts the impedance from the state indicated by the broken line in FIG. 3C to the state indicated by the solid line in FIG. 3C by electrically connecting the inductor 41 to the antenna 7, and electrically connecting the DTC 42 to the antenna 7 after adjusting the capacitance of the DTC 42.

Figure 3D:
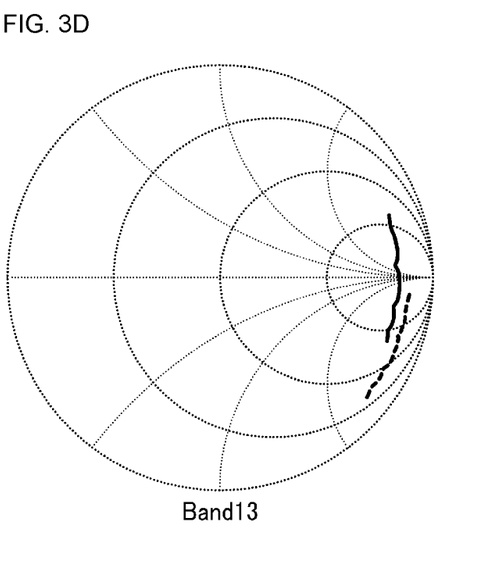

FIG. 3D illustrates impedance of the frequency band of Band 13 when viewed from the filter 21 of Band 26. A broken line in FIG. 3D indicates the impedance before adjustment, and a solid line in FIG. 3D indicates the impedance after adjustment. In this case, the variable phase shifter 4 adjusts the impedance from the state indicated by the broken line in FIG. 3D to the state indicated by the solid line in FIG. 3D by electrically connecting the inductor 41 to the antenna 7, and electrically connecting the DTC 42 to the antenna 7 after adjusting the capacitance of the DTC 42.

4. Operations of Radio Frequency Module

Next, operations of the radio frequency module 1 according to the embodiment will be described with reference to FIG. 1.

First, a case of the first single mode in which the signals of Band 26 are communicated will be described. In this case, the switch 5 selects the selection terminal 52 as the connection destination of the common terminal 51. The switch 5 switches the connection destination of the common terminal 51 to the selection terminal 52. That is, the filter 21 is electrically connected to the antenna 7. The radio frequency module 1 outputs a radio frequency transmission signal outputted from the filter 21 to the antenna 7 via the first matching circuit 31 and the switch 5. Then, the radio frequency transmission signal is radiated from the antenna 7 as a radio signal. On the other hand, a radio frequency reception signal received by the antenna 7 is inputted to the filter 21 via the switch 5 and the first matching circuit 31.

Then, a case of the first carrier aggregation mode in which the signals of Band 5 and the signals of Band 12 are simultaneously communicated will be described. In this case, the switch 5 selects the selection terminal 52, the selection terminal 53, the selection terminal 57, and the selection terminal 58 as the connection destinations of the common terminal 51. That is, the filter 21, the filter 22, the inductor 41, and the DTC 42 are electrically connected to the antenna 7. The radio frequency module 1 outputs a radio frequency transmission signal outputted from the filter 21 to the antenna 7 via the first matching circuit 31 and the switch 5. Then, the radio frequency transmission signal is radiated from the antenna 7 as a radio signal. On the other hand, a radio frequency reception signal received by the antenna 7 is branched by the switch 5. A radio frequency reception signal of Band 5 is outputted to the filter 21 via the first matching circuit 31. A radio frequency reception signal of Band 12 is outputted to the filter 22 via the second matching circuit 32. In the frequency band of Band 5, since the impedance on the filter 22 side is large, even though the antenna 7 and the filter 22 are electrically connected to each other, the radio frequency reception signal of Band 5 is not outputted to the filter 22. In addition, in the frequency band of Band 12, since the impedance on the filter 21 side is large, even though the antenna 7 and the filter 21 are electrically connected to each other, the radio frequency reception signal of Band 12 is not outputted to the filter 21.

Subsequently, a case of the second carrier aggregation mode in which the signals of Band 18 and the signals of Band 28A are simultaneously communicated will be described. In this case, the switch 5 selects the selection terminal 52, the selection terminal 55, the selection terminal 57, and the selection terminal 58 as the connection destinations of the common terminal 51. That is, the filter 21, the filter 24, the inductor 41, and the DTC 42 are connected to the antenna 7. The radio frequency module 1 outputs a radio frequency transmission signal outputted from the filter 21 to the antenna 7 via the first matching circuit 31 and the switch 5. Then, the radio frequency transmission signal is radiated from the antenna 7 as a radio signal. On the other hand, a radio frequency reception signal received by the antenna 7 is branched by the switch 5. A radio frequency reception signal of Band 18 is outputted to the filter 21 via the first matching circuit 31. A radio frequency reception signal of Band 28A is outputted to the filter 24 via the fourth matching circuit 34. In the frequency band of Band 18, since the impedance on the filter 24 side is large, even though the antenna 7 and the filter 24 are electrically connected to each other, the radio frequency reception signal of Band 18 is not outputted to the filter 24. In addition, in the frequency band of Band 28A, since the impedance on the filter 21 side is large, even though the antenna 7 and the filter 21 are electrically connected to each other, the radio frequency reception signal of Band 28A is not outputted to the filter 21.

5. Communication Apparatus

As illustrated in FIG. 2, a communication apparatus 6 includes the radio frequency module 1, a baseband signal processing circuit 61, and an RF signal processing circuit 62.

5.1. Baseband Signal Processing Circuit

As illustrated in FIG. 2, the baseband signal processing circuit 61 is, for example, a Baseband Integrated circuit (BBIC) and is electrically connected to the RF signal processing circuit 62. The baseband signal processing circuit 61 generates an I-phase signal and a Q-phase signal from a baseband signal. The baseband signal processing circuit 61 performs IQ modulation processing by combining the I-phase signal and the Q-phase signal and outputs a transmission signal. In this case, the transmission signal is generated as a modulated signal obtained by performing amplitude modulation on a carrier wave signal having a predetermined frequency at a cycle longer than a cycle of the carrier wave signal. The baseband signal processing circuit 61 outputs the transmission signal to the power supply control unit 65.

The RF signal processing circuit 62 executes digital pre-distortion (DPD) processing. More specifically, the RF signal processing circuit 62 stores time component compensation data for compensating time delay occurring between the power supply control unit 65 and a power amplifier 631. Further, the RF signal processing circuit 62 stores data for compensating amplitude distortion and phase distortion generated in output power P2 of the power amplifier 631. The RF signal processing circuit 62 reads the time component compensation data and the amplitude/phase distortion compensation data and generates the I-phase signal and the Q-phase signal so as to compensate the distortion in advance. By performing the DPD processing, it is possible to suppress a frequency component of a reception signal, which is included in the transmission signal.

5.2. RF Signal Processing Circuit

As illustrated in FIG. 2, the RF signal processing circuit 62 is, for example, a Radio Frequency Integrated Circuit (RFIC) and is provided between the radio frequency module 1 and the baseband signal processing circuit 61. The RF signal processing circuit 62 has a function of performing signal processing on the radio frequency transmission signal from the baseband signal processing circuit 61 and a function of performing signal processing on the radio frequency reception signal received by the antenna 7. The RF signal processing circuit 62 is a multi-band processing circuit and is capable of generating and amplifying transmission signals of a plurality of communication bands.

5.3. Transmission Circuit

As illustrated in FIG. 2, the transmission circuit 63 includes the power amplifier 631 and a power supply (not illustrated) for the power amplifier 631. The power amplifier 631 amplifies the radio frequency transmission signal from the RF signal processing circuit 62. The power amplifier 631 amplifies input power P1 to the output power P2.

5.4. Power Supply Control Unit

As illustrated in FIG. 2, the power supply control unit 65 receives the transmission signal from the baseband signal processing circuit 61 and controls a power supply voltage of the transmission circuit in accordance with an amplitude level of the transmission signal. The power supply control unit 65 is an Envelope Tracking (ET) modulator using an ET scheme. The power supply control unit 65 controls the power supply voltage by using the envelope tracking scheme, thereby improving power efficiency. The power supply control unit 65 may be a module constituted by a plurality of circuit elements or may be an Integrated Circuit (IC). Hereinafter, details of operations of the power supply control unit 65 will be described.

The power supply control unit 65 detects an envelope of the signal outputted from the baseband signal processing circuit 61. That is, the power supply control unit 65 detects a waveform (envelope signal) of the amplitude modulation of the carrier wave signal that constitutes the transmission signal. More specifically, the power supply control unit 65 detects the envelope signal from the I-phase signal and the Q-phase signal.

The power supply control unit 65 determines the power supply voltage signal by using the waveform of the envelope signal and an amplification factor set in advance. The cycle of the power supply voltage signal is the same as the cycle of the envelope signal. Amplitude fluctuation of the power supply voltage signal is the same as amplitude fluctuation of the envelope signal. That is, amplitude characteristics (cycle and amplitude fluctuation) of the envelope signal and the power supply voltage signal are the same as each other. The power supply control unit 65 applies the power supply voltage signal to the power amplifier 631.

As described above, the power supply control unit 65 performs the envelope tracking processing on the transmission signal, thereby performing the amplification processing.

The power supply control unit 65 has a function of controlling the power supply voltage of the power amplifier 631 in accordance with the amplitude level of the transmission signal. More specifically, the power supply control unit 65 determines the power supply voltage signal to be supplied to the power amplifier 631 based on information of the transmission signal from the baseband signal processing circuit 61 and controls the power supply voltage of the power amplifier 631.

5.5. Band Switch

The band switch 66 has a common terminal 661 and a plurality of (five in the illustrated example) selection terminals 662 to 666. The band switch 66 switches a selection terminal that is connected to the common terminal 661 among the plurality of selection terminals 662 to 666. The common terminal 661 is electrically connected to the matching network 64. The plurality of selection terminals 662 to 666 corresponds to the plurality of filters 21 to 25 in a one-to-one manner and is electrically connected to the corresponding filters 21 to 25. More specifically, the selection terminal 662 is electrically connected to the filter 21. The selection terminal 663 is electrically connected to the filter 22. The selection terminal 664 is electrically connected to the filter 23. The selection terminal 665 is electrically connected to the filter 24. The selection terminal 666 is electrically connected to the filter 25.

5.6. Time Delay

Figure 4:
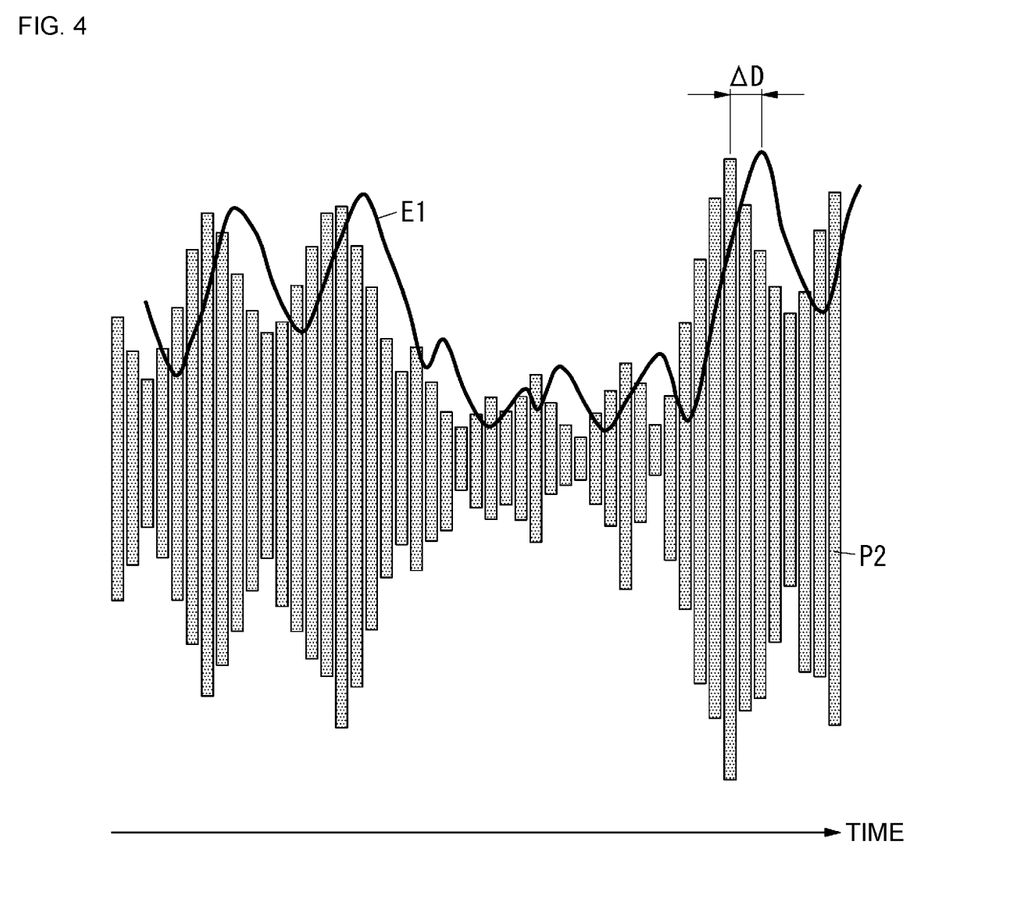
FIG. 4 is a waveform chart illustrating time delay of output power in a power amplifier of the above-described communication apparatus.

When the phase of the output power P2 of the power amplifier 631 changes, time delay ΔD may occur between a tracking waveform from the power supply control unit 65 and a waveform of the output power P2 of the power amplifier 631, and tracking may not be performed successfully. As illustrated in FIG. 4, the time delay ΔD occurs in the output power P2 of the power amplifier 631 with respect to an envelope waveform E1 from the power supply control unit 65. For this reason, it is necessary to adjust the phase of the output power P2 of the power amplifier 631.

Therefore, in the radio frequency module 1, the variable phase shifter 4 changes (makes different) the phase in the first single mode in which the signals of the first frequency band are communicated and the phase in the first carrier aggregation mode in which the signals of the fourth frequency and the signals of the second frequency band are simultaneously communicated. More specifically, the variable phase shifter 4 changes (makes different) the phase in the first single mode in which the signals of Band 26 are communicated, the phase in the carrier aggregation mode in which the signals of Band 5 and the signals of Band 12 are simultaneously communicated, the phase in the carrier aggregation mode in which the signals of Band 5 and the signals of Band 13 are simultaneously communicated, and the phase in the carrier aggregation mode in which the signals of Band 5 and the signals of Band 29 are simultaneously communicated.

The variable phase shifter 4 also changes (makes different) the phase in the first single mode in which the signals of the first frequency band are communicated and the phase in the second carrier aggregation mode in which the signals of the fifth frequency band and the signals of the third frequency band are simultaneously communicated. More specifically, the variable phase shifter 4 changes (makes different) the phase in the single mode in which the signals of Band 26 are communicated and the phase in the carrier aggregation mode in which the signals of Band 18 and the signals of Band 28A are simultaneously communicated.

The phase difference between the phase in the first single mode and the phase in the first carrier aggregation mode and the phase difference between the phase in the first single mode and the phase in the second carrier aggregation mode are differentiated. More specifically, the phase difference between the phase in the single mode in which the signals of Band 26 are communicated and the phase in the carrier aggregation mode in which the signals of Band 5 and the signals of Band 12 are simultaneously communicated is different from the phase difference between the phase in the single mode in which the signals of Band 26 are communicated and the phase in the carrier aggregation mode in which the signals of Band 18 and the signals of Band 28A are simultaneously communicated.

In the embodiment, in a second single mode in which the signals of the fourth frequency band are communicated, the switch 5 connects the first filter and the variable phase shifter 4 to the antenna 7. More specifically, in the single mode in which the signals of Band 5 are communicated, the switch 5 connects the filter 21 and the inductor 41 of the variable phase shifter 4 to the antenna 7.

The variable phase shifter 4 brings the phase in the second single mode in which the signals of the fourth frequency band are communicated closer to the phase in the first carrier aggregation mode than the phase in the first single mode in which the signals of the first frequency band are communicated. More specifically, the variable phase shifter 4 brings the phase in the single mode in which the signals of Band 5 are communicated closer to the phase in the carrier aggregation mode in which the signals of Band 5 and the signals of Band 12 are simultaneously communicated than the phase in the single mode in which the signals of Band 26 are communicated.

In particular, in the embodiment, the variable phase shifter 4 sets the phase in the second single mode in which the signals of the fourth frequency band are communicated to be the same as the phase in the first carrier aggregation mode. More specifically, the variable phase shifter 4 sets the phase in the single mode in which the signals of Band 5 are communicated to be the same as the phase in the carrier aggregation mode in which the signals of Band 5 and the signals of Band 12 are simultaneously communicated.

Similarly, in a third single mode in which the signals of the fifth frequency band are communicated, the switch 5 connects the first filter and the variable phase shifter 4 to the antenna 7. More specifically, in the single mode in which the signals of Band 18 are communicated, the switch 5 connects the filter 21 and the inductor 41 of the variable phase shifter 4 to the antenna 7.

The variable phase shifter 4 brings the phase in the third single mode in which the signals of the fifth frequency band are communicated closer to the phase in the second carrier aggregation mode than the phase in the first single mode in which the signals of the first frequency band are communicated. More specifically, the variable phase shifter 4 brings the phase in the single mode in which the signals of Band 18 are communicated close to the phase in the carrier aggregation mode in which the signals of Band 18 and the signals of Band 28A are simultaneously communicated.

In particular, in the embodiment, the variable phase shifter 4 sets the phase in the third single mode in which the signals of the fifth frequency band are communicated to be the same as the phase in the second carrier aggregation mode. More specifically, the variable phase shifter 4 sets the phase in the single mode in which the signals of Band 18 are communicated to be the same as the phase in the carrier aggregation mode in which the signals of Band 18 and the signals of Band 28A are simultaneously communicated.

6. Effects

As described above, in the radio frequency module 1 including at least the first to third filters, the switch 5, and the variable phase shifter 4, the variable phase shifter 4 changes the phase in the first single mode in which the signals of the first frequency band are communicated and the phase in the first carrier aggregation mode, and changes the phase in the first single mode and the phase in the second carrier aggregation mode. Further, the phase difference between the phase in the first single mode and the phase in the first carrier aggregation mode and the phase difference between the phase in the first single mode and the phase in the second carrier aggregation mode are different from each other. Accordingly, it is possible to open the opposite-side frequency bands in the plurality of carrier aggregations.

In the radio frequency module 1 according to the embodiment, the variable phase shifter 4 brings the phase in the second single mode in which the signals of the fourth frequency band are communicated closer to the phase in the first carrier aggregation mode than the phase in the first single mode. This makes it possible to reduce the reflection of the transmission signal in the filter 21 (first filter) and thus to suppress the time delay of the transmission signal.

In the radio frequency module 1 according to the embodiment, the variable phase shifter 4 sets the phase in the second single mode to be the same as the phase in the first carrier aggregation mode. This makes it possible to further reduce the reflection of the transmission signal in the filter 21 (first filter) and thus to further suppress the time delay of the transmission signal.

In the radio frequency module 1 according to the embodiment, the variable phase shifter 4 brings the phase in the third single mode in which the signals of the fifth frequency band are communicated closer to the phase in the second carrier aggregation mode than the phase in the first single mode. This makes it possible to reduce the reflection of the transmission signal in the filter 21 (first filter) and thus to suppress the time delay of the transmission signal.

In the radio frequency module 1 according to the embodiment, the variable phase shifter 4 sets the phase in the third single mode to be the same as the phase in the second carrier aggregation mode. This makes it possible to further reduce the reflection of the transmission signal in the filter 21 (first filter) and thus to further suppress the time delay of the transmission signal.

Embodiment 2

1. Radio Frequency Module

First, the overall configuration of the radio frequency module 1 according to Embodiment 2 will be described with reference to the drawings.

As illustrated in FIG. 1, the radio frequency module 1 according to the embodiment includes the filter 21 (first filter), the filter 22 (second filter), the filter 23 (third filter), the filter 24 (fifth filter), and the filter 25 (fourth filter). Further, the radio frequency module 1 includes the switch 5, the Digital Tunable Capacitor (DTC) 312 (series variable capacitance element), and the variable phase shifter (variable reactance circuit) 4. The filter 21 transmits signals of Band 26 (first frequency band). The filter 22 transmits signals of Band 12 (second frequency band). The filter 23 transmits signals of Band 13 (third frequency band). The filter 24 transmits signals of Band 28A (seventh frequency band). The filter 25 transmits signals of Band 29 (sixth frequency band). The switch 5 selectively connects the filter 21, the filter 22, the filter 23, the filter 24, and the filter 25 and the antenna 7 to each other. The DTC 312 is connected in series between the filter 21 and the switch 5. The variable phase shifter 4 is provided between the switch 5 and the ground, and the reactance between both terminals is variable. Band 26 includes Band 5 (fourth frequency band) and Band 18 (fifth frequency band).

In a single mode in which the signals of Band 26 are communicated, the switch 5 electrically connects at least the filter 21 to the antenna 7. In a first carrier aggregation mode in which signals of Band 5 and the signals of Band 12 are simultaneously communicated, the switch 5 electrically connects the filter 21, the filter 22, and the variable phase shifter 4 to the antenna 7. In a second carrier aggregation mode in which the signals of Band 5 and the signals of Band 13 are simultaneously communicated, the switch 5 electrically connects the filter 21, the filter 23, and the variable phase shifter 4 to the antenna 7. In a third carrier aggregation mode in which the signals of Band 5 and the signals of Band 29 are simultaneously communicated, the switch 5 electrically connects the filter 21, the filter 25, and the variable phase shifter 4 to the antenna 7. In a fourth carrier aggregation mode in which the signals of Band 18 and the signals of Band 28A are simultaneously communicated, the switch 5 electrically connects the filter 21, the filter 24, and the variable phase shifter 4 to the antenna 7.

In the above-described radio frequency module 1, the variable phase shifter 4 makes the reactance different from one another among the single mode in which the signals of Band 26 are communicated, the first carrier aggregation mode, and the second carrier aggregation mode.

The radio frequency module 1 according to the embodiment is used for an electronic apparatus such as a mobile phone including a smartphone, as in Embodiment 1.

2. Each of Constituent Components of Radio Frequency Module

Next, each of constituent components of the radio frequency module 1 according to the embodiment will be described with reference to the drawings.

As illustrated in FIG. 1, the radio frequency module 1 includes the plurality of (five in the illustrated example) filters 21 to 25, the plurality of (five in the illustrated example) matching circuits (the first matching circuit 31, the second matching circuit 32, the third matching circuit 33, the fourth matching circuit 34, and the fifth matching circuit 35), the variable phase shifter 4, and the switch 5. As illustrated in FIG. 2, the radio frequency module 1 further includes the transmission circuit 63, the matching network 64, the power supply control unit 65, and the band switch 66. Note that for the radio frequency module 1 according to Embodiment 2, the description of the configurations and the functions similar to those of the radio frequency module 1 according to Embodiment 1 will be omitted.

2.1. Filter

The filter 21 transmits the signals of Band 26 of the LTE standard. Band 26 includes Band 5 and Band 18 of the LTE standard. Band 26 corresponds to the first frequency band, Band 5 corresponds to the fourth frequency band included in the first frequency band, and Band 18 corresponds to the fifth frequency band included in the first frequency band. The filter 21 corresponds to the first filter that transmits the signals of the first frequency band including the fourth frequency band and the fifth frequency band.

The filter 22 transmits the radio frequency signals of Band 12 of the LTE standard. Band 12 is used for a carrier aggregation together with Band 5 and therefore corresponds to the second frequency band that is used for the first carrier aggregation together with the fourth frequency band. The filter 22 corresponds to the second filter that transmits the signals of the second frequency band.

The filter 23 transmits the radio frequency signals of Band 13 of the LTE standard. Band 13 is used for the carrier aggregation together with Band 5 and therefore corresponds to the third frequency band that is used for the second carrier aggregation together with the fourth frequency band. The filter 23 corresponds to the third filter that transmits the signals of the third frequency band.

The filter 24 transmits the radio frequency signals of Band 28A of the LTE standard. Band 28A is used for the carrier aggregation together with Band 18 and therefore corresponds to the seventh frequency band that is used for the third carrier aggregation together with the fifth frequency band. The filter 24 corresponds to the fifth filter that transmits the signals of the seventh frequency band.

The filter 25 transmits the radio frequency signals of Band 29 of the LTE standard. Band 29 is used for the carrier aggregation together with Band 5 and therefore corresponds to the sixth frequency band that is used for the second carrier aggregation together with the fourth frequency band. The filter 25 corresponds to the fourth filter that transmits the signals of the sixth frequency band.

3. Communication Apparatus

As illustrated in FIG. 2, the communication apparatus 6 includes the radio frequency module 1, the baseband signal processing circuit 61, and the RF signal processing circuit 62 similarly to Embodiment 1. The baseband signal processing circuit 61 in the embodiment has the same configuration and function as those of the baseband signal processing circuit 61 in Embodiment 1. The RF signal processing circuit 62 in the embodiment has the same configuration and function as those of the RF signal processing circuit 62 in Embodiment 1.

4. Effects

As described above, in the radio frequency module 1 according to the embodiment, the reactance is made different among the first single mode in which the signals of the first frequency band are communicated, the first carrier aggregation mode in which the signals of the fourth frequency band included in the first frequency band and the second frequency band are simultaneously communicated, and the second carrier aggregation mode in which the signals of the fourth frequency band included in the first frequency band and the third frequency band are simultaneously communicated. Accordingly, it is possible to open the opposite-side bands in the plurality of carrier aggregations while reducing the change in communication characteristics between the single mode and the carrier aggregation modes. Here, the opposite-side band indicates the other frequency band when viewed from one frequency band of two frequency bands in the carrier aggregation.

In the radio frequency module 1 according to the embodiment, the first filter is a SAW filter. In this case, the opposite-side impedance in the carrier aggregation using the signal of the first filter has a capacitive component in many cases. It is conceivable that the radio frequency module 1 includes a plurality of inductors corresponding to the plurality of opposite-side frequency bands in order to open the opposite-side impedances, but the number of inductors is preferably small because the inductor has a large size.

Therefore, in the radio frequency module 1 according to the embodiment, the variable phase shifter (variable reactance circuit) 4 includes one inductor 41 and a parallel variable capacitance element (DTC 42). With this configuration, the opposite-side impedance that is used for the carrier aggregation can be moved in an open direction by one inductor 41, and excessive inductivity can be adjusted by the parallel variable capacitance element depending on the opposite-side frequency band to be used for the carrier aggregation. As a result, it is possible to open the opposite-side frequency band in each of the plurality of opposite-side frequency bands while suppressing the increase in the size of the radio frequency module 1.

In the radio frequency module 1 according to the embodiment, the variable phase shifter (variable reactance circuit) 4 differentiates a phase in the first single mode in which the signals of the first frequency band are communicated and a phase in the first carrier aggregation mode and differentiates the phase in the first single mode and a phase in the third carrier aggregation mode. Further, a phase difference between the phase in the first single mode and the phase in the first carrier aggregation mode and a phase difference between the phase in the first single mode and the phase in the third carrier aggregation mode are differentiated. Accordingly, it is possible to open the opposite-side frequency bands in the plurality of carrier aggregations.

Variations

Hereinafter, variations of Embodiments 1 and 2 will be described.

The variable phase shifter 4 in each of Embodiments 1 and 2 may include a plurality of inductors in place of the inductor 41 and the DTC 42. The plurality of inductors includes a first inductor and a second inductor connected in parallel to the first inductor.

In the first carrier aggregation mode, the variable phase shifter 4 electrically connects the first inductor to the antenna 7. In the second carrier aggregation mode, the variable phase shifter 4 electrically connects the second inductor to the antenna 7.

The variable phase shifter 4 may include at least one capacitor instead of the DTC 42. That is, the variable phase shifter 4 may include the inductor 41 and at least one capacitor. The above-described capacitor is provided between the switch 5 and the ground and is connected in parallel to the inductor 41.

The radio frequency module 1 according to each of the variations described above also achieves the same effects as those of the radio frequency module 1 according to each of Embodiments 1 and 2.

The embodiments and variations described above are a part of various embodiments and variations of the present disclosure. Further, the embodiments and variations can be modified in various manners in accordance with design and the like as long as the object of the present disclosure can be achieved.

SUMMARY

The following aspects are disclosed with the embodiments and variation described above.

A radio frequency module (1) according to a first aspect includes a first filter (filter 21), a second filter (filter 22; filter 23; filter 25), a third filter (filter 24), a switch (5), and a variable phase shifter (4). The first filter transmits signals of a first frequency band (Band 26). The second filter transmits signals of a second frequency band (Band 12; Band 13; Band 29). The third filter transmits signals of a third frequency band (Band 28A). The switch (5) has a common terminal (51), a first connected terminal (selection terminal 52), a second connected terminal (selection terminal 53), and a third connected terminal (selection terminal 54). The common terminal (51) is connected to an antenna (7). The first connected terminal is connected to the first filter. The second connected terminal is connected to the second filter. The third connected terminal is connected to the third filter. The variable phase shifter (4) is provided between the switch (5) and ground. The first frequency band includes a fourth frequency band (Band 5) and a fifth frequency band (band 18). In a first single mode in which the signals of the first frequency band are communicated, the switch (5) electrically connects the first filter to the common terminal (51). In a first carrier aggregation mode in which signals of the fourth frequency band and the signals of the second frequency band are simultaneously communicated, the switch (5) electrically connects the first filter, the second filter, and the variable phase shifter (4) to the common terminal (51). In a second carrier aggregation mode in which signals of the fifth frequency band and the signals of the third frequency band are simultaneously communicated, the switch (5) electrically connects the first filter, the third filter, and the variable phase shifter (4) to the common terminal (51). The variable phase shifter (4) differentiates a phase in the first single mode and a phase in the first carrier aggregation mode and differentiates the phase in the first single mode and a phase in the second carrier aggregation mode. The radio frequency module (1) makes a phase difference between the phase in the first single mode and the phase in the first carrier aggregation mode different from a phase difference between the phase in the first single mode and the phase in the second carrier aggregation mode.

In the radio frequency module (1) according to the first aspect, the variable phase shifter (4) differentiates the phase in the first single mode in which the signals of the first frequency band (Band 26) are communicated and the phase in the first carrier aggregation mode and differentiates the phase in the first single mode and the phase in the second carrier aggregation mode. Further, the radio frequency module (1) makes the phase difference between the phase in the first single mode and the phase in the first carrier aggregation mode different from the phase difference between the phase in the first single mode and the phase in the second carrier aggregation mode. Accordingly, it is possible to open the opposite-side frequency bands in the plurality of carrier aggregations.

In the radio frequency module (1) according to a second aspect, in a second single mode in which the signals of the fourth frequency band (Band 5) are communicated, the switch (5) electrically connects the first filter (filter 21) and the variable phase shifter (4) to the common terminal (51), in the first aspect. The variable phase shifter (4) brings a phase in the second single mode closer to the phase in the first carrier aggregation mode than the phase in the first single mode.

In the radio frequency module (1) according to the second aspect, the variable phase shifter (4) brings the phase in the second single mode in which the signals of the fourth frequency band (Band 5) are communicated closer to the phase in the first carrier aggregation mode than the phase in the first single mode. This makes it possible to reduce the reflection of a transmission signal in the first filter (filter 21) and thus to suppress the time delay of the transmission signal.

In the radio frequency module (1) according to a third aspect, the variable phase shifter (4) sets the phase in the second single mode to be the same as the phase in the first carrier aggregation mode, in the second aspect.

In the radio frequency module (1) according to the third aspect, the variable phase shifter (4) sets the phase in the second single mode to be the same as the phase in the first carrier aggregation mode. This makes it possible to further reduce the reflection of the transmission signal in the first filter (filter 21) and thus to further suppress the time delay of the transmission signal.

In the radio frequency module (1) according to a fourth aspect, in a third single mode in which signals of the fifth frequency band (Band 18) are communicated, the switch (5) electrically connects the first filter and the variable phase shifter (4) to the common terminal (51), in the second or third aspect. The variable phase shifter (4) brings a phase in the third single mode closer to the phase in the second carrier aggregation mode than the phase in the first single mode.

In the radio frequency module (1) according to the fourth aspect, the variable phase shifter (4) brings the phase in the third single mode closer to the phase in the second carrier aggregation mode than the phase in the first single mode. This makes it possible to reduce the reflection of the transmission signal in the first filter (filter 21) and thus to suppress the time delay of the transmission signal.

In the radio frequency module (1) according to a fifth aspect, the variable phase shifter (4) sets the phase in the third single mode to be the same as the phase in the second carrier aggregation mode, in the fourth aspect.

In the radio frequency module (1) according to the fifth aspect, the variable phase shifter (4) sets the phase in the third single mode to be the same as the phase in the second carrier aggregation mode. This makes it possible to further reduce the reflection of the transmission signal in the first filter (filter 21) and thus to further suppress the time delay of the transmission signal.

In the radio frequency module (1) according to a sixth aspect, the variable phase shifter (4) includes an inductor (41) and a capacitor, in any one of the first to fifth aspects. The inductor (41) is provided between the switch (5) and the ground. The capacitor is provided between the switch (5) and the ground and is connected in parallel to the inductor (41).

In the radio frequency module (1) according to a seventh aspect, the variable phase shifter (4) includes an inductor (41) and a variable capacitance element (DTC 42), in any one of the first to fifth aspects. The inductor (41) is provided between the switch (5) and the ground. The variable capacitance element is provided between the switch (5) and the ground and is connected in parallel to the inductor (41).

A radio frequency module (1) according to an eighth aspect includes the first filter (filter 21), the second filter (filter 22), the third filter (filter 23), the switch (5), the first variable capacitance element (DTC 312), and the variable reactance circuit (variable phase shifter 4). The first filter transmits signals of a first frequency band (Band 26). The second filter transmits signals of a second frequency band (Band 12). The third filter transmits signals of a third frequency band (Band 13). The switch (5) has a common terminal (51), a first connected terminal (selection terminal 52), a second connected terminal (selection terminal 53), and a third connected terminal (selection terminal 54). The common terminal (51) is connected to an antenna (7). The first connected terminal is connected to the first filter. The second connected terminal is connected to the second filter. The third connected terminal is connected to the third filter.

The first variable capacitance element is connected in series between the first filter and the switch (5). The variable reactance circuit (variable phase shifter 4) is provided between the switch (5) and the ground. The first frequency band includes a fourth frequency band (Band 5) and a fifth frequency band (band 18). In a single mode in which signals of the first frequency band are communicated, the switch (5) electrically connects at least the first filter to the common terminal (51). In a first carrier aggregation mode in which signals of the fourth frequency band and the signals of the second frequency band are simultaneously communicated, the switch (5) electrically connects the first filter, the second filter, and the variable reactance circuit (variable phase shifter 4) to the common terminal (51). In a second carrier aggregation mode in which signals of the fourth frequency band and signals of the third frequency band are simultaneously communicated, the switch (5) electrically connects the first filter, the third filter, and the variable reactance circuit (variable phase shifter 4) to the common terminal (51). The first variable capacitance element differentiates capacitance among the single mode, the first carrier aggregation mode, and the second carrier aggregation mode. The variable reactance circuit (variable phase shifter 4) differentiates reactance among the single mode, the first carrier aggregation mode, and the second carrier aggregation mode.

In the radio frequency module (1) according to the eighth aspect, the reactance is differentiated among the single mode in which the signals of the first frequency band (Band 26) are communicated, the first carrier aggregation mode in which the signals of the fourth frequency band (Band 5) included in the first frequency band and the signals of the second frequency band (Band 12) are simultaneously communicated, and the second carrier aggregation mode in which the signals of the fourth frequency band and signals of the third frequency band (Band 13) are simultaneously communicated. Accordingly, it is possible to open the opposite-side frequency bands in the plurality of carrier aggregations while reducing the change in the communication characteristics between the single mode and the carrier aggregation modes.

The radio frequency module (1) according to a ninth aspect further includes a fourth filter (filter 25), in the eighth aspect. The fourth filter transmits signals of a sixth frequency band (Band 29). The first filter (filter 21) is a SAW filter. The variable reactance circuit (variable phase shifter 4) includes the inductor (41) and a second variable capacitance element (DTC 42). The second variable capacitance element is connected in parallel to the inductor (41). The second variable capacitance element can switch a first capacitance, a second capacitance, and a third capacitance that are different from one another. In a single mode, the variable reactance circuit (variable phase shifter 4) electrically disconnects the inductor (41) and the second variable capacitance element from the antenna (7). In the first carrier aggregation mode, the variable reactance circuit (variable phase shifter 4) electrically connects the inductor (41) and the second variable capacitance element to the antenna (7) and sets capacitance of the second variable capacitance element to be the first capacitance. In the second carrier aggregation mode, the variable reactance circuit (variable phase shifter 4) electrically connects the inductor (41) and the second variable capacitance element to the antenna (7) and sets the capacitance of the second variable capacitance element to be the second capacitance. In a third carrier aggregation mode in which the signals of the fourth frequency band (Band 5) and signals of the sixth frequency band (Band 29) are simultaneously communicated, the variable reactance circuit (variable phase shifter 4) electrically connects the inductor (41) and the second variable capacitance element to the antenna (7) and sets the capacitance of the second variable capacitance element to be the third capacitance.

In the radio frequency module (1) according to the ninth aspect, the first filter (the filter 21) is the SAW filter. In this case, the opposite-side impedance in the carrier aggregation using the signal of the first filter has a capacitive component in many cases (the fourth quadrant of the Smith chart). It is conceivable that the radio frequency module includes a plurality of inductors corresponding to the plurality of opposite-side frequency bands in order to open the opposite-side impedances, but the number of inductors is preferably small because the inductor has a large size.

Therefore, in the radio frequency module (1) according to the ninth aspect, the variable reactance circuit (variable phase shifter 4) includes one inductor (41) and the second variable capacitance element (DTC 42). With this configuration, the opposite-side impedance that is used for the carrier aggregation can be moved in an open direction (moved to the first quadrant of the Smith chart) by one inductor (41), and excessive inductivity can be adjusted by the second variable capacitance element depending on the opposite-side frequency band to be used for the carrier aggregation. As a result, it is possible to open the opposite-side frequency band in each of the plurality of opposite-side frequency bands while suppressing the increase in the size of the radio frequency module (1).

The radio frequency module (1) according to a tenth aspect further includes a fifth filter (filter 24), in the eighth or ninth aspect. The fifth filter transmits signals of a seventh frequency band (Band 28A). In a fourth carrier aggregation mode in which signals of the fifth frequency band (Band 18) and signals of the seventh frequency band are simultaneously communicated, the switch (5) connects the first filter (filter 21), the fifth filter, and the variable reactance circuit (variable phase shifter 4) to the antenna (7). The variable reactance circuit (variable phase shifter 4) differentiates the phase in the single mode and the phase in the first carrier aggregation mode and differentiates the phase in the single mode and a phase in the fourth carrier aggregation mode. A phase difference between the phase in the single mode and the phase in the first carrier aggregation mode is different from a phase difference between the phase in the single mode and the phase in the fourth carrier aggregation mode.

In the radio frequency module (1) according to the tenth aspect, the variable reactance circuit (variable phase shifter 4) differentiates the phase in the single mode in which the signals of the first frequency band (Band 26) are communicated and the phase in the first carrier aggregation mode and differentiates the phase in the single mode and the phase in the fourth carrier aggregation mode. Further, the phase difference between the phase in the single mode and the phase in the first carrier aggregation mode and the phase difference between the phase in the single mode and the phase in the fourth carrier aggregation mode are differentiated. Accordingly, it is possible to open the opposite-side frequency bands in the plurality of carrier aggregations.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A radio frequency module comprising:
   a first filter that transmits signals of a first frequency band;
   a second filter that transmits signals of a second frequency band;
   a third filter that transmits signals of a third frequency band;
   a switch that has a common terminal connected to an antenna, a first connected terminal connected to the first filter, a second connected terminal connected to the second filter, and a third connected terminal connected to the third filter; and
   a variable phase shifter that is provided between the switch and ground,
   wherein the first frequency band includes a fourth frequency band and a fifth frequency band,
   in a first single mode in which the signals of the first frequency band are communicated, the switch electrically connects the first filter to the common terminal,
   in a first carrier aggregation mode in which signals of the fourth frequency band and the signals of the second frequency band are simultaneously communicated, the switch electrically connects the first filter, the second filter, and the variable phase shifter to the common terminal;
   in a second carrier aggregation mode in which signals of the fifth frequency band and the signals of the third frequency band are simultaneously communicated, the switch electrically connects the first filter, the third filter, and the variable phase shifter to the common terminal,
   the variable phase shifter differentiates a phase in the first single mode and a phase in the first carrier aggregation mode,
   the variable phase shifter differentiates the phase in the first single mode and a phase in the second carrier aggregation mode, and
   a first phase difference between the phase in the first single mode and the phase in the first carrier aggregation mode is different from a second phase difference between the phase in the first single mode and the phase in the second carrier aggregation mode, and
   wherein in a second single mode in which the signals of the fourth frequency band are communicated, the switch electrically connects the first filter and the variable phase shifter to the common terminal, and
   the variable phase shifter brings a phase in the second single mode closer to the phase in the first carrier aggregation mode than the phase in the first single mode.

2. The radio frequency module according to claim 1,
   wherein the variable phase shifter sets the phase in the second single mode to be the same as the phase in the first carrier aggregation mode.

3. The radio frequency module according to claim 2,
   wherein in a third single mode in which signals of the fifth frequency band are communicated, the switch electrically connects the first filter and the variable phase shifter to the common terminal, and
   the variable phase shifter brings a phase in the third single mode closer to the phase in the second carrier aggregation mode than the phase in the first single mode.

4. The radio frequency module according to claim 1,
   wherein in a third single mode in which signals of the fifth frequency band are communicated, the switch electrically connects the first filter and the variable phase shifter to the common terminal, and
   the variable phase shifter brings a phase in the third single mode closer to the phase in the second carrier aggregation mode than the phase in the first single mode.

5. The radio frequency module according to claim 4,
   wherein the variable phase shifter sets the phase in the third single mode to be the same as the phase in the second carrier aggregation mode.

6. The radio frequency module according to claim 1, further comprising:
   a first matching circuit connected between the first filter and the switch;
   a second matching circuit connected between the second filter and the switch; and
   a third matching circuit connected between the third filter and the switch.

7. The radio frequency module according to claim 6,
   wherein the first matching circuit includes:
   a variable capacitance element connected in series between the first filter and the switch; and
   an inductor and a variable capacitance provided on a first path between the ground and a node on a second path connecting the first filter and the switch.

8. A communication apparatus comprising:
   a baseband signal processing circuit;
   an RF signal processing circuit; and
   the radio frequency module according to claim 7.

9. The radio frequency module according to claim 1, further comprising:
   a transmission circuit;
   a matching network;
   a power supply control unit; and
   a band switch.

10. The radio frequency module according to claim 9, wherein the transmission circuit comprises a power amplifier and a power supply.

11. A communication apparatus comprising:
    a baseband signal processing circuit;
    an RF signal processing circuit; and
    the radio frequency module according to claim 1.

12. A radio frequency module comprising:
    a first filter that transmits signals of a first frequency band;
    a second filter that transmits signals of a second frequency band;
    a third filter that transmits signals of a third frequency band;
    a switch that has a common terminal connected to an antenna, a first connected terminal connected to the first filter, a second connected terminal connected to the second filter, and a third connected terminal connected to the third filter; and
    a variable phase shifter that is provided between the switch and ground,
    wherein the first frequency band includes a fourth frequency band and a fifth frequency band,
    in a first single mode in which the signals of the first frequency band are communicated, the switch electrically connects the first filter to the common terminal,
    in a first carrier aggregation mode in which signals of the fourth frequency band and the signals of the second frequency band are simultaneously communicated, the switch electrically connects the first filter, the second filter, and the variable phase shifter to the common terminal;
    in a second carrier aggregation mode in which signals of the fifth frequency band and the signals of the third frequency band are simultaneously communicated, the switch electrically connects the first filter, the third filter, and the variable phase shifter to the common terminal, the variable phase shifter differentiates a phase in the first single mode and a phase in the first carrier aggregation mode, the variable phase shifter differentiates the phase in the first single mode and a phase in the second carrier aggregation mode, and a first phase difference between the phase in the first single mode and the phase in the first carrier aggregation mode is different from a second phase difference between the phase in the first single mode and the phase in the second carrier aggregation mode, wherein the variable phase shifter includes:
an inductor that is provided between the switch and ground; and
a capacitor that is provided between the switch and the ground and that is connected in parallel to the inductor.

13. The radio frequency module according to claim 12, wherein the capacitor is a variable capacitance element.

14. A radio frequency module comprising:
a first filter that transmits signals of a first frequency band;
a second filter that transmits signals of a second frequency band;
a third filter that transmits signals of a third frequency band;
a switch that has a common terminal connected to an antenna, a first connected terminal connected to the first filter, a second connected terminal connected to the second filter, and a third connected terminal connected to the third filter;
a first variable capacitance element that is connected in series between the first filter and the switch; and
a variable reactance circuit that is provided between the switch and ground,
wherein the first frequency band includes a fourth frequency band and a fifth frequency band,
in a single mode in which the signals of the first frequency band are communicated, the switch electrically connects at least the first filter to the common terminal,
in a first carrier aggregation mode in which signals of the fourth frequency band and the signals of the second frequency band are simultaneously communicated, the switch electrically connects the first filter, the second filter, and the variable reactance circuit to the common terminal;
in a second carrier aggregation mode in which the signals of the fourth frequency band and the signals of the third frequency band are simultaneously communicated, the switch electrically connects the first filter, the third filter, and the variable reactance circuit to the common terminal,
the first variable capacitance element differentiates capacitance among the single mode, the first carrier aggregation mode, and the second carrier aggregation mode, and
the variable reactance circuit differentiates reactance among the single mode, the first carrier aggregation mode, and the second carrier aggregation mode.

15. The radio frequency module according to claim 14, further comprising a fourth filter that transmits signals of a sixth frequency band,
wherein the first filter is a SAW filter,
the variable reactance circuit includes:
an inductor; and
a second variable capacitance element that is connected in parallel to the inductor,
the second variable capacitance element is configured to switch first capacitance, second capacitance, and third capacitance that are different from one another, and
in the single mode, the variable reactance circuit electrically disconnects the inductor and the second variable capacitance element from the antenna,
in the first carrier aggregation mode, the variable reactance circuit electrically connects the inductor and the second variable capacitance element to the antenna and sets capacitance of the second variable capacitance element to be the first capacitance,
in the second carrier aggregation mode, the variable reactance circuit electrically connects the inductor and the second variable capacitance element to the antenna and sets the capacitance of the second variable capacitance element to be the second capacitance, and
in a third carrier aggregation mode in which the signals of the fourth frequency band and the signals of the sixth frequency band are simultaneously communicated, the variable reactance circuit electrically connects the inductor and the second variable capacitance element to the antenna and sets the capacitance of the second variable capacitance element to be the third capacitance.

16. The radio frequency module according to claim 15, further comprising a fifth filter that transmits signals in a seventh frequency band,
wherein in a fourth carrier aggregation mode in which the signals of the fifth frequency band and the signals of the seventh frequency band are simultaneously communicated, the switch electrically connects the first filter, the fifth filter, and the variable reactance circuit to the common terminal,
the variable reactance circuit differentiates a phase in the single mode and a phase in the first carrier aggregation mode,
the variable reactance circuit differentiates the phase in the single mode and a phase in the fourth carrier aggregation mode, and
a first phase difference between the phase in the single mode and the phase in the first carrier aggregation mode is different from a second phase difference between the phase in the single mode and the phase in the fourth carrier aggregation mode.

17. The radio frequency module according to claim 14, further comprising a fifth filter that transmits signals in a seventh frequency band,
wherein in a fourth carrier aggregation mode in which the signals of the fifth frequency band and the signals of the seventh frequency band are simultaneously communicated, the switch electrically connects the first filter, the fifth filter, and the variable reactance circuit to the common terminal,
the variable reactance circuit differentiates a phase in the single mode and a phase in the first carrier aggregation mode,
the variable reactance circuit differentiates the phase in the single mode and a phase in the fourth carrier aggregation mode, and
a first phase difference between the phase in the single mode and the phase in the first carrier aggregation mode is different from a second phase difference between the phase in the single mode and the phase in the fourth carrier aggregation mode.

18. The radio frequency module according to claim 14, further comprising:
   a transmission circuit;
   a matching network;
   a power supply control unit; and
   a band switch.

19. The radio frequency module according to claim 18, wherein the transmission circuit comprises a power amplifier and a power supply.

* * * * *

UNITED STATES PATENT AND TRADEMARK OFFICE
CERTIFICATE OF CORRECTION

PATENT NO. : 11,290,134 B2
APPLICATION NO. : 17/023822
DATED : March 29, 2022
INVENTOR(S) : Tahara et al.

It is certified that error appears in the above-identified patent and that said Letters Patent is hereby corrected as shown below:

In the Specification

Column 6, Line 48, "circuit (capacitor 322)" should be -- circuit 32 (capacitor 322) --.

Signed and Sealed this
Seventh Day of February, 2023

Katherine Kelly Vidal
*Director of the United States Patent and Trademark Office*